United States Patent

[11] 3,631,739

| [72] | Inventor | Rulon D. McArthur<br>Route 3, Bitterroot Road, Missoula, Mont. 59801 |
|---|---|---|
| [21] | Appl. No. | 61,269 |
| [22] | Filed | Aug. 5, 1970 |
| [45] | Patented | Jan. 4, 1972 |

[54] ADJUSTABLE ACCELERATOR FOOT PEDAL
11 Claims, 3 Drawing Figs.

[52] U.S. Cl. .................................................... 74/513,
74/560
[51] Int. Cl. .................................................... G05g 1/14
[50] Field of Search.......................................... 74/560,
513, 512, 519, 89.14, 561

[56] References Cited
UNITED STATES PATENTS
2,924,117  2/1960  Byrd, Sr. ..................... 74/513 X
3,541,881  11/1970  Pharis ........................... 74/512

*Primary Examiner*—William F. O'Dea
*Assistant Examiner*—F. D. Shoemaker
*Attorney*—Graybeal, Cole & Barnard ABSTRACT: An accelerator foot pedal for a motor vehicle having a footrest portion which is angularly adjustable with respect to a support frame on which it is pivotally mounted. The support frame includes a heel portion extending outwardly therefrom and through the floor or fire wall of the vehicle which is adapted to be connected to the throttle control linkage of the vehicle. A control lever is pivotally mounted at a point between its ends on the support frame. One end of the control lever is connected to a manually controlled actuating means such as a hydraulic cylinder and piston which is adapted to move the control lever with respect to the support frame. The opposite end of the control lever is in contact with the footrest portion and is adapted to angularly position it with respect to the support frame in response to the movement of the actuating means.

PATENTED JAN 4 1972　　　　　　3,631,739
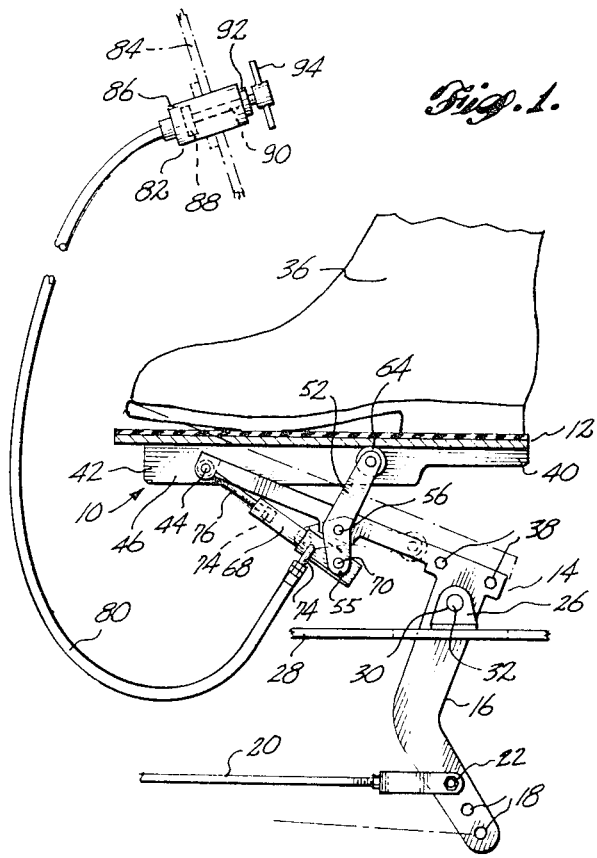
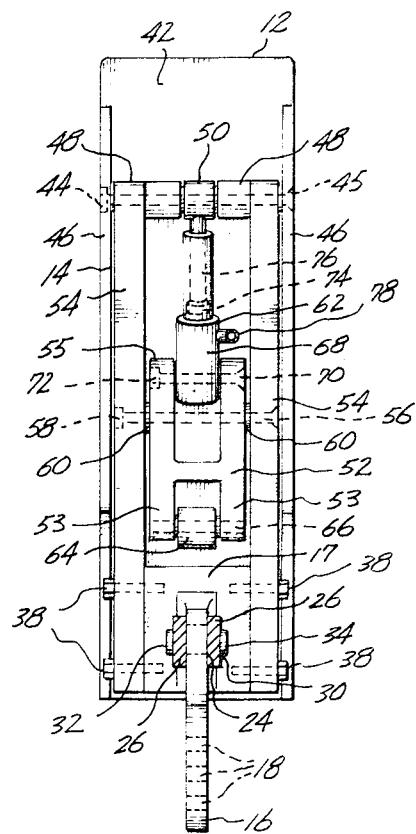
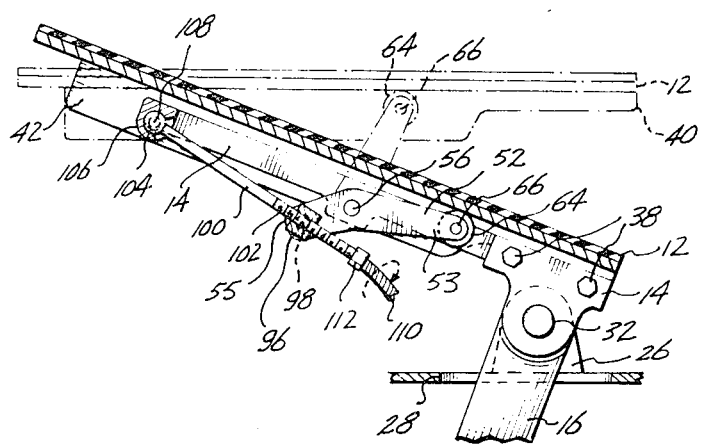
Fig. 1.
Fig. 2.
Fig. 3.
INVENTOR.
RULON D. MCARTHUR
BY
Mayfred, Cole, & Barnard
ATTORNEYS

3,631,739

ADJUSTABLE ACCELERATOR FOOT PEDAL

BACKGROUND OF THE INVENTION

1. Field of the Invention

This invention relates in general, to a fatigue-reducing apparatus for a motor vehicle operator, and in particular, to an accelerator foot pedal having an angularly adjustable footrest portion which allows the motor vehicle operator to change the angle at which his foot rests on the accelerator to prevent leg fatigue.

2. Description of the Prior Art

The construction of motor vehicle accelerator pedals commonly in use requires the operator's foot to be held in more or less the same position while driving, often resulting in a certain amount of discomfort for the operator, particularly on long trips. This problem is of particular significance for truck drivers who spend long hours behind the wheel of their vehicle. Bachmann, U.S. Pat. No. 3,088,331 discloses apparatus for relieving operator foot fatigue consisting of a push-pull rod 38 which acts as an extension of arm 30 to change the plane of rotation of the toe of the accelerator footrest about the connection between the heel of the footrest and the floorboard of the vehicle. In Bachmann, adjustment of the footrest directly affects the throttle control linkage.

SUMMARY OF THE INVENTION

The present invention includes an accelerator foot pedal having a footrest portion which is angularly adjustable with respect to a support frame to which the footrest is pivotally connected near its toe portion. The support frame includes an integral outwardly extending heel portion which is adapted to be connected to the throttle control linkage of the motor vehicle. The support frame, including the heel portion thereof, does not vary in orientation with respect to the throttle control linkage with the pivoting of the footrest, but rather maintains a constant relation therewith. The footrest is pivoted with respect to the support frame by a generally elongate control lever which is rotatably mounted at a point distant from either end on the support frame. One end of the control lever may be connected to a hydraulic cylinder and piston system, the extension or retraction of which with respect to each other is controllable by the operator of the vehicle from a point distant the foot pedal. Movement of the cylinder or piston with respect to each other causes the control lever to pivot about its connection with the support frame. The distal end of the control lever contacts the footrest and supports it in any desired position in response to the pivoting of the control lever.

In another embodiment, an externally threaded pin which is adapted to be rotated by a cable running from the foot pedal to a dashboard control is associated with an internally threaded bracket mounted on one end of the control lever such that rotation of the threaded pin imparts longitudinal movement to the bracket therealong, thereby causing the control lever to pivot about its connection with the support frame, and the distal end thereof to move the footrest to any desired angular position.

It is an object of the present invention therefore to provide an accelerator foot pedal having an angularly adjustable footrest.

Another object is to provide an adjustable accelerator foot pedal having a footrest which is pivotal with respect to a support frame about a connection near its toe portion.

Still another object is to provide an adjustable accelerator foot pedal wherein the footrest portion is oriented in response to the pivotal movement of a control lever.

One more object is to provide an adjustable accelerator foot pedal wherein the control lever for orienting the footrest is itself pivoted in response to the extension or compression of a hydraulic cylinder and piston system.

Still another object is to provide an adjustable accelerator foot pedal wherein the pivotal footrest is oriented in response to the movement of a control lever by a rotatable worm running through a bracket mounted on one end of the control lever.

One additional object is to provide an adjustable accelerator foot pedal having an angularly adjustable footrest which may be oriented by the operator of the vehicle while the vehicle is in motion.

Still another object is to provide an accelerator foot pedal having an adjustable footrest wherein the application of force to the accelerator pedal by the operator provides the same vehicle control regardless of the orientation of the footrest.

Additional objects and advantages will become apparent from the following description taken in conjunction with the accompanying drawings.

BRIEF DESCRIPTION OF THE DRAWINGS

FIG. 1 is a side elevation view of an adjustable accelerator foot pedal typifying the present invention, including the footrest shown in a second position in dotted line, a hydraulic control mounted on a section of a vehicle dashboard, and a schematic view of the vehicle operator's foot disposed on the footrest.

FIG. 2 is a bottom plan view of the adjustable accelerator foot pedal of FIG. 1, including the hydraulic cylinder and piston shown in the compressed position.

FIG. 3 is a sectional elevation view of a second typical embodiment of the present invention, including a rotating pin actuating means for pivoting the footrest, and further including the footrest shown in a second position in dotted line.

DETAILED DESCRIPTION OF THE INVENTION

Referring now to FIG. 1, an adjustable accelerator pedal 10 is disclosed having a footrest portion 12, a support frame portion 14 and an integrally connected heel portion 16 extending outwardly from the support frame. Heel portion 16 includes holes 18 to which the throttle control linkage 20 of the motor vehicle is adapted to be connected. A plurality of holes are provided in heel portion 16 to allow for initial adjustment of the accelerator pedal with respect to the throttle control linkage, and to additionally allow the accelerator pedal to be mounted on virtually any type of motor vehicle. It should be understood that any conventional means such as nut and bolt 22 may be used to connect the throttle control linkage to the heel portion 16.

Referring also to FIG. 2, it will be seen that heel portion 16 includes an additional hole 24 near support frame portion 14. Brackets 26, which are mounted on the floor or fire wall 28 of the motor vehicle, include aligned hole portions 30 with which hole 24 is adapted to be held in alignment by conventional means such as bolt 32 and nut 34. In already constructed embodiments, a ½-inch diameter bolt and cooperating nut have been found to be satisfactory. This bracket and pin configuration mounted on the floor of the motor vehicle provides a fulcrum about which the adjustable accelerator pedal is pivoted. It will be readily understood from FIG. 1, that the application of downward pressure to the foot pedal by foot 36 causes the accelerator pedal to pivot about brackets 26 such that heel portion 16 transmits this movement to the throttle control linkage. This transmission of movement is unaffected by the orientation of footrest 12 with respect to support frame 14.

In the disclosed embodiments, heel portion 16 is connected to support frame 14 by conventional bolts 38 which extend through the support frame and into the widened top 17 of heel portion 16. It is understood that other conventional fastening means or techniques such as rivets or welding may be substituted for bolts 38. Accelerator footrest 12, having a heel portion 40 and a toe portion 42, is connected by bolt 44 and cooperating nut 45 to support frame 14 near its toe portion 42. Referring particularly to FIG. 2, it will be seen that bolt 44 is disposed in aligned holes in side portions 46 of footrest 12, arms 54 of support frame 14, spacers 48 and hydraulic piston support 50. The aligned holes through which bolt 44 extends are of slightly larger cross-sectional area than bolt 44 such that footrest 12, support frame 14, and hydraulic piston support 50, are pivotal thereabout with respect to each other. Again, a welded in place pin or a rivet or other conventional means may be substituted for bolt 44.

The pivotal movement of footrest 12 with respect to support frame 14 is controlled by lever arm 52 which is connected between arms 54 of support frame 14 by bolt 56 and cooperating nut 58 or other conventional means. Spacers 60 are provided between lever arm 52 and the arms 54 of support frame 14 to perform substantially the same function as spacers 48 above, namely, keeping lever arm 52 and the attached hydraulic cylinder and piston system 62 which will be described hereafter, centered between the arms 54 of support frame 14.

Lever arm 52 is substantially H-shaped and includes a roller or bushing 64 mounted on axle 66 extending between parallel arms 53. Hydraulic cylinder 68 is pivotally connected by conventional bolt 70 and nut 72 between the generally oppositely extending parallel arms 55 of lever arm 52. Hydraulic cylinder 68 cooperates with piston 74 which is mounted on one end of piston rod 76. The opposite end of piston rod 76 is connected to piston rod support 50 which is adapted to pivot about bolt 44. Hydraulic fluid connection 78 extends outwardly from cylinder 68 and is connected by conventional means to hose 80 which runs to hydraulic control 82. Control 82 may be mounted on the dashboard 84 of the motor vehicle, or at any other point near the operator of the vehicle such that it may be manipulated by the operator while the vehicle is under way.

As shown, hydraulic control 82 comprises a hydraulic fluid storage chamber 86 having a piston 88 mounted on a threaded piston rod 90 which extends out of chamber 86 opposite hose 80. Threaded piston rod 90 cooperates with internally threaded fitting 92 mounted on chamber 86 such that rotary manipulation of handle 94 causes piston 88 to move longitudinally within chamber 86. Rotation of handle 94 in one direction forces hydraulic fluid out of chamber 86, through hose 80 and into cylinder 68, while rotation of handle 94 in the opposite direction allows the hydraulic fluid to flow out of cylinder 68, back through hose 80 and into storage chamber 86.

In practice, the operator of a motor vehicle equipped with an adjustable accelerator pedal made according to the present invention is able to relieve leg and foot fatigue while driving in the following manner. Assuming the motor vehicle has been under way for a time with footrest 12 in a position generally parallel to support frame 14 as shown, for example, in dotted line in FIG. 1. It will be readily understood from the above, that heel portion 40 of footrest 12 may be pivoted about bolt 44 away from the support frame 14 by rotating handle 94 of hydraulic control 82. The rotation of handle 94 in the proper direction, causes piston 88 to move towards the connection of hose 80 to fluid storage chamber 86 to compress the fluid such that it is forced through hose 80 and into cylinder 68 of the adjustable accelerator pedal. The fluid entering cylinder 68 creates a pressure head which bears against the face of piston 74. Piston 74 which is mounted on rod 76 is fixed against longitudinal movement, and thus the fluid pressure causes the cylinder itself to move away from piston 74. The movement of cylinder 68 causes lever arm 52 to which it is connected to pivot about pin 56 towards the full line position shown in FIG. 1. Roller 64 mounted on lever arm 52 opposite the connection to cylinder 68 bears against the bottom portion of footrest 12 causing it to pivot about pin 44. It will thus be readily understood, that the amount of rotation of handle 94 controls the degree of pivoting of lever arm 52 about pin 56 which, in turn, governs the extent of angular movement of heel portion 40 of footrest 12 with respect to support frame 14.

The rotation of handle 94 in the opposite direction allows the hydraulic fluid within chamber 68 to flow back through hose 80 and into storage chamber 86, allowing cylinder 68 to move towards piston 74, thereby pivoting lever arm 52 and moving the heel portion of footrest 12 toward support frame 14.

Single acting cylinder and piston system 62 provides the side advantage of cushioning road shocks which would otherwise be transmitted to the foot of the operator. It will be readily understood that a double acting cylinder and piston system might be substituted for this system, but the cushioning effect is substantially diminished when a double acting system is used.

Referring now to FIG. 3, a second typical embodiment of the present invention is disclosed having a mechanical, rather than hydraulic, actuating mechanism. Lever arm 52 includes an internally threaded bracket portion 96 pivotally mounted between the pair of generally parallel arms 55. Conventional mounting means such as bolts 98 may be used to hold bracket 96 between the parallel arms 55 of lever arm 52. Rod 100 extends through bracket 96, and includes externally threaded portion 102 which is adapted to cooperate with the internally threaded bracket 96. Rod 100 includes ball portion 104 on one end, which is rotatably mounted in socket 106 which is mounted on support frame 14. It will be readily understood that socket 106 may be disposed at approximately the same position as piston rod support 50 in the embodiment of FIGS. 1 and 2, thereby requiring opposed bolts 108 to be substituted for bolt 44. Socket 106 may, however, be mounted at other equally satisfactory points on support frame 14 with the necessary changes in structure being considered to be mere mechanical expedients.

Cable 110 is connected by means of coupling joint 112 to the end of rod 100 distal ball 104. Although not shown, cable 110 runs to a control lever or knob mounted on the dashboard of the vehicle, or at some other point where it may be easily manipulated by the vehicle operator while the vehicle is in motion. Rotation of cable 110 and connected rod 100, causes internally threaded bracket 96 to move longitudinally on threads 102. It will be readily understood that the rotation of cable 110 in one direction will cause bracket 96 to move towards connecting joint 112 such that lever arm 52 is pivoted about pin 56 towards the dotted line position shown in FIG. 3. As described above, roller 64 moves on the bottom of footrest 12 to orient the footrest in response to the pivoting of lever arm 52.

Rotation of cable 110 in the opposite direction, causes bracket 96 to travel towards ball 104 thereby pivoting lever arm 52 such that the heel portion 40 of footrest 12 is moved towards support frame 14.

It is contemplated that a gearing system may be used in conjunction with cable 110 such that, for example, a single turn of the control arm would result in cable 110 being rotated a number of times for easier adjustment of footrest 12.

It is also contemplated that adjustable foot pedals of the disclosed construction may be used as brake or clutch pedals, where adjustment of the position of a pedal to correspond to the size of the operator, rather than fatigue, is the problem which is sought to be overcome.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. An adjustable accelerator pedal for a motor vehicle comprising a support frame having an integral outwardly extending heel portion, said heel portion adapted to be connected to the throttle control linkage of said vehicle, a footrest portion pivotally connected near one end to said support frame, a control lever pivotally mounted on said support frame at a point between its longitudinal ends, one end of said control lever being connected to a manually controlled pivoting means, the other end of said lever being in contact with said footrest.

2. The adjustable accelerator pedal of claim 1 wherein said footrest portion may be pivoted with respect to said support frame such that the heel of the foot of the vehicle operator disposed on said adjustable accelerator pedal may be raised or lowered while the toes of said foot remain substantially stationary.

3. The adjustable accelerator pedal of claim 1 wherein said heel portion of said support is adapted to pivot about a bracket mounted on said vehicle.

4. The adjustable accelerator pedal of claim 1 wherein said footrest portion is connected near its toe end to said support frame.

5. The adjustable accelerator pedal of claim 1 wherein said control lever includes a rotatable portion in contact with said footrest.

6. The adjustable accelerator pedal of claim 1 wherein said manually controlled pivoting means comprises a hydraulic cylinder and piston, a hydraulic control means and a hollow tube interconnecting said cylinder and piston and said hydraulic control means.

7. The adjustable accelerator pedal of claim 1 wherein one end of said control lever includes an internally threaded bracket, and said manually controlled pivoting means includes an externally threaded rotatable worm, said bracket and said worm adapted to cooperate such that rotation of said worm causes said bracket to move longitudinally thereon to pivot said control lever.

8. An adjustable accelerator pedal for a motor vehicle comprising a support frame, said support frame including a heel portion extending outwardly from one end of said support frame, said heel portion adapted to be connected to the throttle linkage of said vehicle, a footrest portion having a toe portion and a heel portion pivotally connected near its toe portion to said support frame, control lever means pivotally disposed on said support frame, control lever actuating means connected to said control lever, said control lever actuating means adapted to pivot said control lever and said control lever adapted to pivot said footrest portion such that the relative position of said footrest heel and said support frame may be varied.

9. The adjustable accelerator pedal of claim 8 wherein said control lever actuating means comprises a hydraulic cylinder and piston, hydraulic control means mounted within reach of the operator of said vehicle and a hollow tube interconnecting said hydraulic control means and said hydraulic cylinder and piston.

10. The adjustable accelerator pedal of claim 8 wherein said control lever actuating means comprises a threaded pin connected to one end of a rotatable cable, the other end of said rotatable cable connected to manual control means mounted for manipulation by the operator of said vehicle, said threaded pin connected to a cooperatingly threaded portion of said control lever such that rotation of said pin causes said portion of said control lever to move longitudinally on said pin.

11. The adjustable accelerator pedal of claim 10 wherein said cooperatingly threaded portion of said control lever comprises a pivotal bracket mounted near one end of said control lever.

* * * * *